(12) United States Patent
Weik, III

(10) Patent No.: US 6,945,303 B2
(45) Date of Patent: Sep. 20, 2005

(54) INTRUDER, THEFT AND VANDALISM DETERRENT MANAGEMENT SYSTEM FOR CONTROLLING A PARKING AREA

(76) Inventor: Martin Herman Weik, III, 2032 N. Taylor St., Arlington, VA (US) 22207

( * ) Notice: Subject to any disclaimer, the term of this patent is extended or adjusted under 35 U.S.C. 154(b) by 0 days.

(21) Appl. No.: 10/303,025

(22) Filed: Nov. 25, 2002

(65) Prior Publication Data

US 2003/0075287 A1 Apr. 24, 2003

Related U.S. Application Data

(63) Continuation-in-part of application No. 10/131,029, filed on Apr. 25, 2002, which is a continuation-in-part of application No. 09/644,901, filed on Aug. 24, 2000, now Pat. No. 6,484,784.

(51) Int. Cl.[7] ................................................ E05F 15/00
(52) U.S. Cl. ........................... 160/188; 235/382; 49/49; 340/938
(58) Field of Search ................................. 160/188, 1, 2, 160/3, 7; 235/382, 382.5, 384; 360/2

(56) References Cited

U.S. PATENT DOCUMENTS

| | | | |
|---|---|---|---|
| 1,617,440 A | | 2/1927 | Duncanson |
| 3,604,898 A | * | 9/1971 | Magnusson ................. 235/378 |
| 4,147,197 A | | 4/1979 | Bailey et al. |
| 4,785,293 A | | 11/1988 | Shearer et al. |
| 4,794,973 A | | 1/1989 | Perisic |
| 4,848,522 A | | 7/1989 | Wolf |
| 4,953,608 A | | 9/1990 | Larsson |
| 5,022,452 A | | 6/1991 | Burrell |
| 5,243,735 A | | 9/1993 | Obrien, III |
| 5,245,879 A | | 9/1993 | McKeon |
| 5,270,629 A | | 12/1993 | Hsieh |
| 5,332,021 A | | 7/1994 | Todd et al. |
| 5,355,927 A | | 10/1994 | McKeon |
| 5,386,891 A | | 2/1995 | Shea |
| 5,540,269 A | | 7/1996 | Plumer |
| 5,542,460 A | | 8/1996 | McKeon |
| 5,557,887 A | | 9/1996 | Fellows et al. |
| 5,576,581 A | | 11/1996 | Iannuzzi et al. |
| 5,577,541 A | | 11/1996 | McKeon |
| 5,605,185 A | | 2/1997 | McKeon |
| 5,634,507 A | | 6/1997 | Kwoka |
| 5,673,514 A | | 10/1997 | McKeon |
| 5,706,875 A | | 1/1998 | Simon |
| 5,743,320 A | | 4/1998 | McKeon |
| 5,832,665 A | | 11/1998 | Miller et al. |
| 5,893,234 A | | 4/1999 | McKeon |
| 6,082,433 A | | 7/2000 | Vafaie et al. |
| 2003/0081747 A1 | * | 5/2003 | Ahlstrom et al. ...... 379/102.06 |

* cited by examiner

*Primary Examiner*—Blair M. Johnson
(74) *Attorney, Agent, or Firm*—Birch, Stewart, Kolasch & Birch, LLP

(57) ABSTRACT

A parking area control and management system employs a card reader, which reads identification information from a card commonly carried by a person, such as a driver's license or credit card. A record is made of the identification information upon entrance of a vehicle into the parking area. The person may subsequently leave the parking area on foot and regain entry to the parking area by presenting the same card. Later, the same card is used to exit the parking area, via the vehicle, and to validate that the same person is leaving with the vehicle. The parking area control and management system also includes sensors, such as loop detectors and electric eyes, to determine if a second vehicle or a pedestrian follows behind a vehicle entering into, or exiting from, the parking area. The parking area control and management system can be used to manage existing loop detectors and electric eyes, that normally control door and gate safety access systems, and to integrate those devices into an alarm system, such that an alert is issued whenever an abnormal or unauthorized event occurs during operations.

18 Claims, 8 Drawing Sheets

INTRUDER, THEFT AND VANDALISM DETERRENT MANAGEMENT SYSTEM FOR CONTROLLING A PARKING AREA

This application is a continuation-in-part of Applicant's prior U.S. patent application Ser. No. 10/131,029, filed on Apr. 25, 2002, which is a continuation-in-part of U.S. patent application Ser. No. 09/644,901, filed on Aug. 24, 2000 now U.S. Pat. No. 6,484,784. The contents of the parent applications are hereby incorporated by reference.

BACKGROUND OF THE INVENTION

1. Field of the Invention

The present invention relates to a system for controlling access to, and egress from, a parking area.

2. Description of the Relevant Art

Private and public parking areas, such as garages and lots, are common in urban and suburban areas. Often the entrance to, and exit from, the parking area are monitored and/or controlled. Various systems are known to perform the monitoring and/or controlling functions of the parking area. Such systems range in complexity, such as from simple, manned attendant booths, to semi-automated parking pass systems, to fully automated parking systems.

A first known parking control system employs the use semi-permanent indicia, such as bumper stickers, window stickers or rear view mirror placards. By paying a periodic fee, a person is issued the indicia. When a vehicle enters a parking area, the vehicle must pass through an entrance area. If an attendant or machine recognizes the indicia on the vehicle, the attendant or machine will allow the vehicle to enter the parking area. Often the exit portion of the parking area is completely automated and does not check the indicia, since all of the vehicles which entered the parking area were presumably authorized.

The first known system suffers drawbacks. The indicia is associated with the vehicle, rather than the driver. Therefore, the indicia remains on the vehicle, after the driver has left the vehicle parked in the parking area. If a thief obtains the vehicle from the parking area, the thief can easily pass by the automated exit or the attendant's booth, since the indicia on the vehicle is known and valid to the system. Another drawback is that many people object to placing indicia on their vehicles.

A second known parking control system addresses the drawbacks of the first known system. The second known system employs an attendant located in a booth at a vehicle entrance/exit portion of a parking area, or a ticket printing machine located at the vehicle entrance. When a vehicle enters the parking area, the attendant or ticket printing machine presents the driver with a parking slip printed on a paper card.

Later, when the vehicle exits the parking area, the driver presents the parking slip to the attendant or a ticket reading machine. The attendant or machine either charges a set fee, or perhaps reads a date and time stamp on the parking slip to determine a time-based fee for the parking service. Therefore, in the second known system, the parking authorization is presented to, and associated with, the driver, rather than the vehicle. Further, the driver need not place any indicia on the vehicle.

The second known system also suffers drawbacks. Often, a person does not want to carry the parking slip on their person because it is inconvenient to do so. Further, the person may fear losing the parking slip and having to pay the maximum parking fee. Therefore, the parking slip is usually left in the parked vehicle, such as on the dash, on the passenger's seat, on or in a center console, etc.

Leaving a parking slip in the vehicle is an invitation to a thief to steal the person's vehicle. Once the vehicle is obtained, the thief can simply present the parking slip, pay the parking fee and leave the parking area without raising suspicions. Another drawback to the above system is that a new parking slip must be issued every time a vehicle is parked. This wastes natural resources and costs the parking service provider money.

In order to alleviate the later drawback, a third known parking control system has enjoyed wide spread acceptance. Many parking service providers now issue a plastic parking card, which is uniquely registered to the driver. By paying a periodic fee, the parking service provider maintains the parking card in a valid state. Presentation of the parking card to an attendant or automated card reader allows the driver's vehicle to enter and exit the parking area.

Unfortunately, the third known system also suffers drawbacks. People are resistant to carrying yet another plastic card in their wallet or purse. Further, if a person frequents several different parking areas, managed by different service providers, the problem is exacerbated, since each parking service provider will issue their own unique plastic parking card. Therefore, most people simple "store" their parking cards in their vehicle, such as in a center console or dash glove box. Therefore, again if a thief obtains the vehicle in the parking area, the thief can easily exit the parking area using the valid parking card without raising any suspicions.

Another drawback to the third known system is that it takes time and money to issue a parking card. The plastic cards and machine to encode the cards are expensive to the parking service operator. Further, if a person is patronizing a parking area for the first time, it is a hassle to fill out an application form and wait for a parking card to be issued. Many people also object to the personal information that must be provided in order to obtain the parking card, and worry that the information will be sold to telemarketers and direct mailers.

Yet another drawback is that the third known system is only cost effective to issue parking cards to repeat, or monthly, parking patrons. The third known system has no provision for a onetime, or daily, parking patron, other than to issue an expensive dedicated, parking card. Issuing a parking card to a onetime parking patron would add significantly to the price charged for a day of parking, and/or detract significantly from the profits of the parking service provider. In any event, a parking card would be needed by the onetime, parking patron in order to reenter the parking garage to retrieve the vehicle.

Therefore, there exists a need in the art for a new system for controlling a parking area, which is convenient to parking patrons, which saves parking service providers money, and which deters the theft and/or vandalism of parked vehicles, and allows entry and exit for pre-approved parking patrons on a case by case basis.

Further, there exists a need in the art for an improved parking area management and control system which can more easily detect and deter (1) "vehicle-type tailgating" past a parking barrier, wherein an unauthorized vehicle follows an authorized vehicle into and/or out of the parking area; and (2) "pedestrian-type tailgating" past a parking barrier, wherein a person follows, an authorized vehicle into a parking area. Such a system would reduce the likelihood of vehicle theft and vandalism, reduce the likelihood of lost parking revenue, reduce the operating expenses of a parking area by reducing insurance claims, and improve the safety of the patrons of the parking area.

SUMMARY OF THE INVENTION

It is an object of the present invention to address one or more of the drawbacks associated with the background art.

It is an object of the present invention to provide a parking control system, which operates in combination with a card already issued to, and typically carried by, a parking patron.

It is an object of the present invention to provide a parking control system, which deters vandalism and theft of parked vehicles, as well as assaults and robberies of parking patrons, by issuing an alert signal when an unauthorized vehicle or person attempts to enter or exit the parking area.

It is an object of the present invention to provide a parking control system, which deters vandalism of parked vehicles and/or theft of objects from parked vehicles.

It is an object of the present invention to provide a parking control system, which saves money and time for parking service providers.

It is an object of the present invention to provide a parking control system, which is more convenient and less objectionable to parking area patrons.

These and other objects are accomplished by a parking area control and management system employing a card reader, which reads identification information from a card commonly carried by a person, such as a driver's license or credit card. A record is made of the identification information upon entrance of a vehicle into the parking area. The person may subsequently leave the parking area on foot and regain entry to the parking area by presenting the same card. Later, the same card is used to exit the parking area, via the vehicle, and to validate that the same person is leaving with the vehicle. The parking area control and management system also includes sensors, such as loop detectors and electric eyes, to determine if a second vehicle or a pedestrian follows behind a vehicle entering into the parking area.

The parking area control and management system of the present invention may employ preexisting equipment already in use at the parking area. For example, existing equipment, such as electric eye systems and loop detectors, may be reorganized and integrated into the parking area control and management system of the present invention. The reorganization and integration of the preexisting equipment into the control system of the present invention creates new safety monitoring aspects and other benefits (such as intruder alerts, and tailgating detection) not possible when using the preexisting equipment individually.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
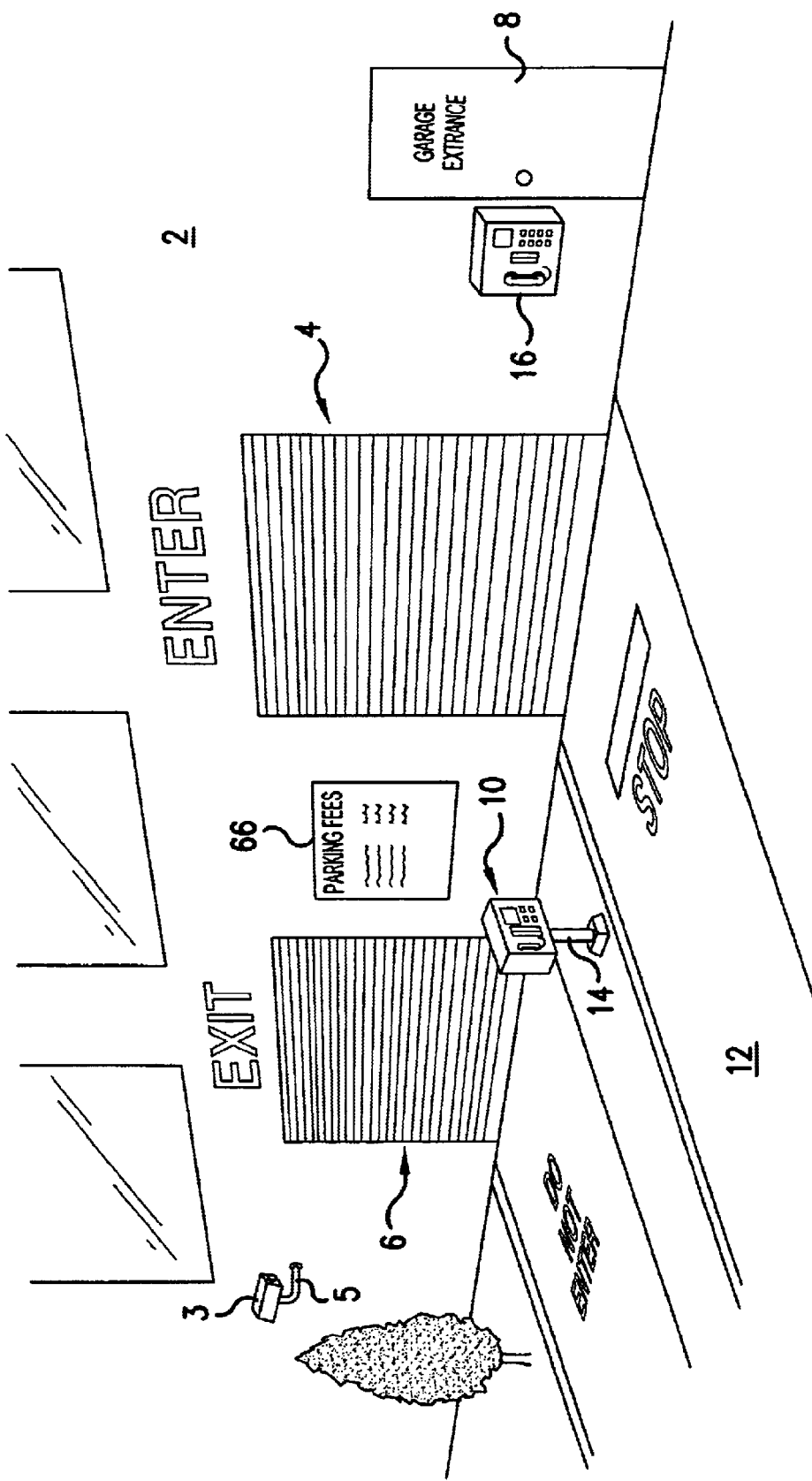
FIG. 1 is an outside perspective view of a parking garage entrance and exit area for vehicles and foot traffic.

FIG. 1 is a perspective view of a building 2 having an underground parking garage viewed from a street outside of the building 2. The building 2 includes a vehicle entrance 4 and a vehicle exit 6. The building 2 also includes an access door 8 for entering and exiting the parking garage by foot. A first customer terminal 10 is located alongside an entrance ramp 12. The first customer terminal 10 is mounted on a post 14, which is situated on a driver's side of the entrance ramp 12. A similar, second customer terminal 16 is provided on an exterior wall of the building 2 adjacent to the door 8. The customer terminals 10, 16 will be described in greater detail with reference to FIG. 3.

A first camera 3 is provided on a post 5 attached to the building 2. The first camera 3 has a view of the outside portions of the vehicle entrance 4, the vehicle exit 6 and the access door 8. The first camera 3 may take one image of the entrance and exit area of the building 2, or a series of images over a time period, as will be further described below.

Figure 2:
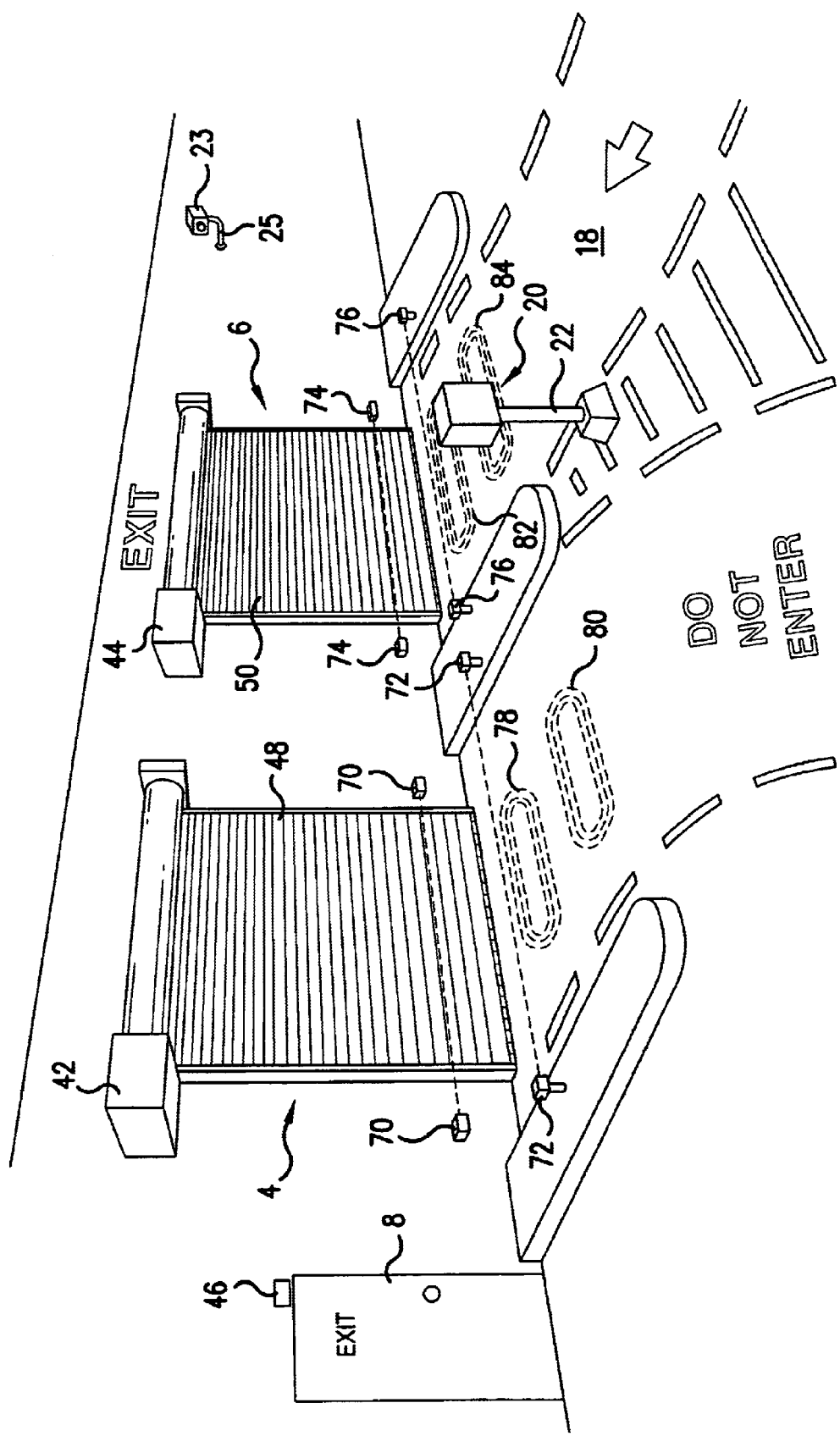
FIG. 2 is an inside perspective view of the parking garage entrance and exit area for vehicles and foot traffic.

FIG. 2 is a perspective view of the vehicle entrance and exit area taken from inside the parking garage. An exit lane 18 leads to the vehicle exit 6. A third customer terminal 20 is located alongside the exit lane 18. The third customer terminal 20 is mounted on a post 22, which is situated on a driver's side of the exit ramp 18.

A second camera 23 is provided on a post 25 attached to an interior wall of the building 2. The second camera 23 has a view of the inside portions of the vehicle entrance 4, the vehicle exit 6 and the access door 8. The second camera 23 may take one image of the entrance and exit area of the building, or a series of images over a time period, as will be further described below.

Figure 3:
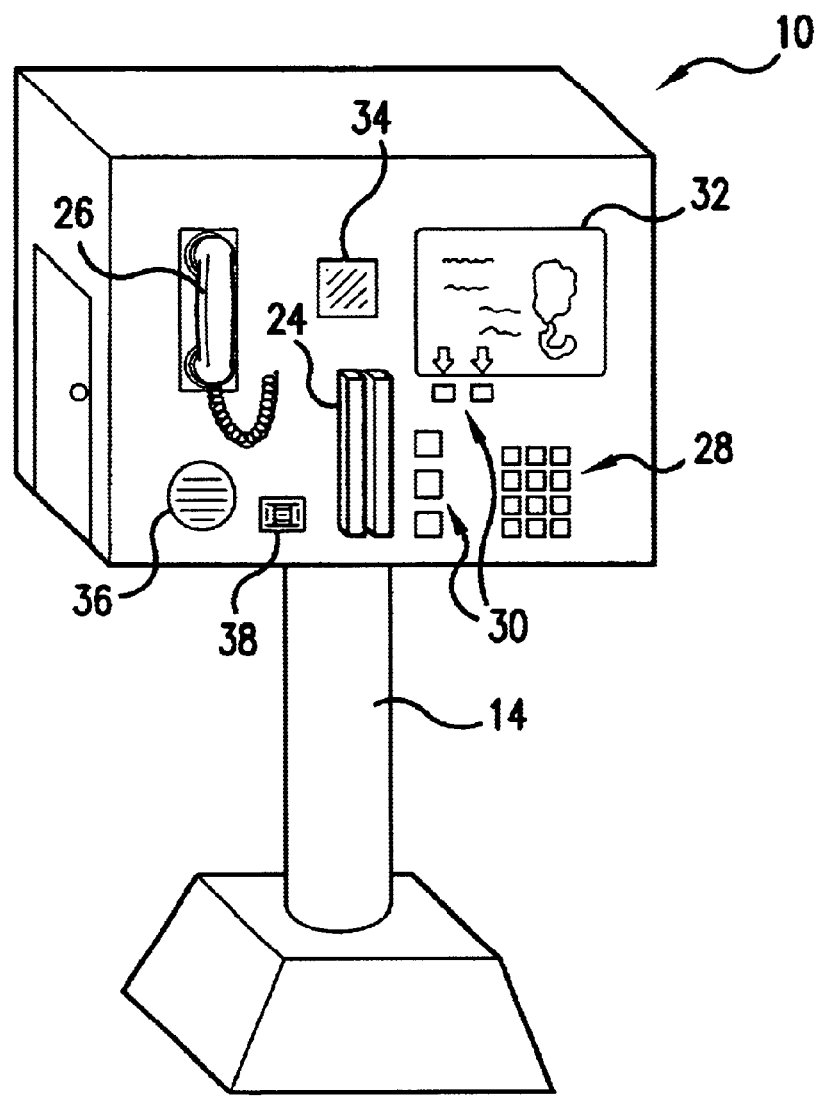
FIG. 3 is a front view of a customer terminal.

FIG. 3 illustrates a configuration for the first, second and/or third customer terminals 10, 16, and 20. Each customer terminal would include at least a card reader in the form of a pull through slot 24 (as commonly used in grocery store checkout lanes) or an insert/withdraw slot (as commonly used at pay gas pumps). The card reader could be used for reading one or more types of cards, such as a magnetic strip or bar code provided on a credit card, a driver's license, etc.

Further, each customer terminal could include a telephone handset 26 for voice communications, a numeric or alphanumeric input keypad 28, a plurality of function keys 30, a video display 32, and a camera 34. Of course, the handset 26 could be replaced with a hands-free speakerphone, such as a speaker 36 and a microphone 38. Further, the keypad 28 and function keys 30 could be replaced with a touch sensitive graphics display provided on the video display 32, or a computer input to interface with a personal digital assistant (PDA) or laptop.

Figure 4:
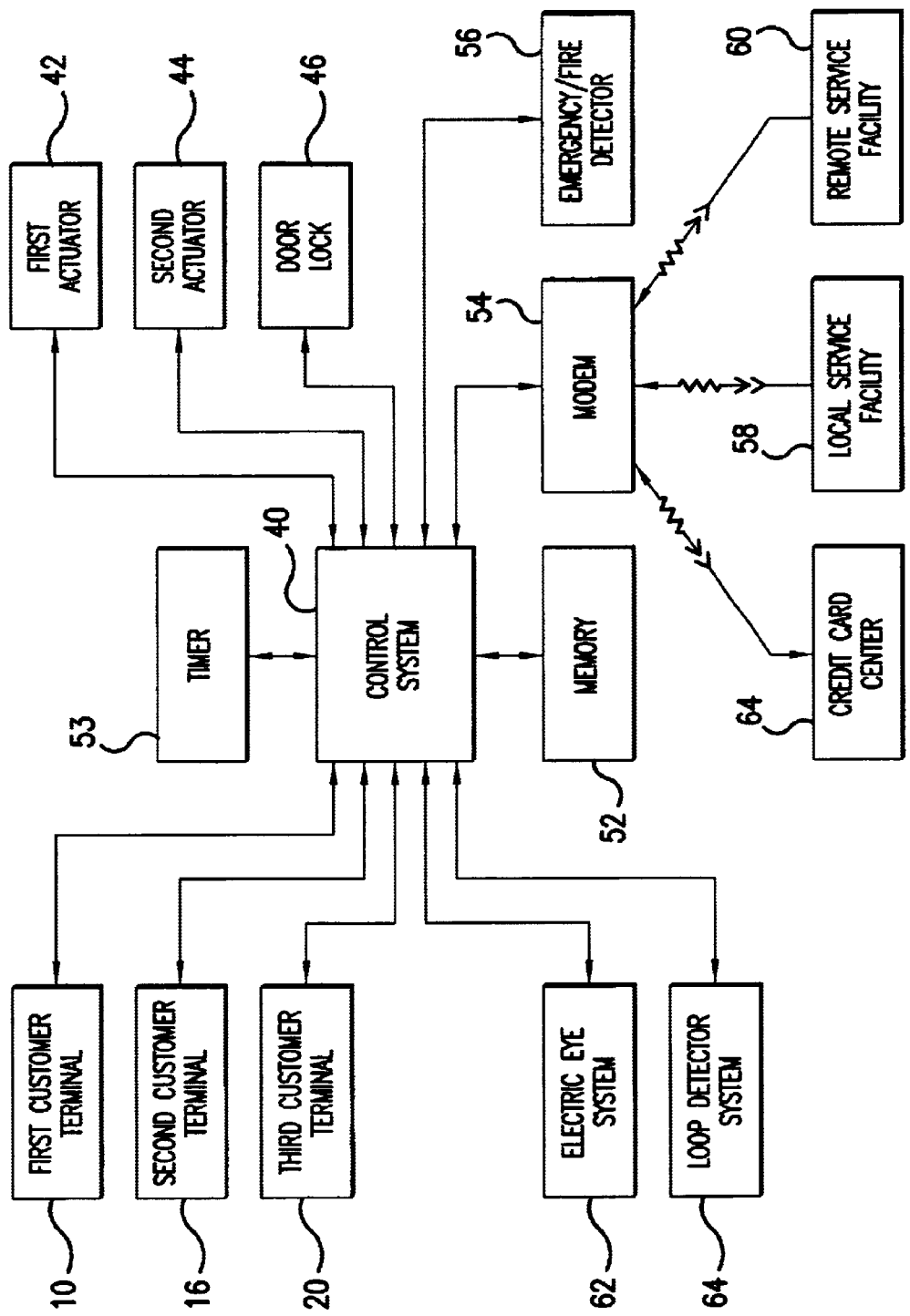
FIG. 4 is a block diagram illustrating an interconnection between various components of the parking area control and management system of the present invention.

FIG. 4 is a block diagram illustrating the interconnections between various components of the present invention. The first customer terminal 10, second customer terminal 16 and third customer terminal 20 are connected to a control system 40. The connections may be hardwired or wireless.

The controller 40 is also connected to a first actuator 42, a second actuator 44 and a door lock 46. The first actuator 42 controls opening and closing of a first gate or door 48, serving as a barrier to the vehicle entrance 4. The second actuator 44 controls opening and closing of a second gate or door 50, serving as a barrier to the vehicle exit 6. The door lock 46 controls the locking of the foot traffic door 8. For example, the door lock 46 could drive a solenoid for withdrawing a dead bolt, and hence unlocking the pedestrian door 8. Alternatively, the door lock 46 may be an electromagnet, which holds the door 8 locked when energized, and which releases the door 8 when de-energized.

As also illustrated in FIG. 4, a memory 52 and a timer 53 are connected to the control system 40. The memory 52 could be a hard drive integrated into, or in the proximity of, the control system 40, or alternatively could be a remote memory device, such as a memory space allocated/at a local personal computer or service provider connected to the control system 40 via a modem 54 over the Internet. Also, the timer 53 could be integrated into the control system 40.

An emergency/fire detector 56 is also connected to the control system 40. The emergency/fire detector 56 could be a collection of fire sensors and pull alarms located in the garage area. More preferably, the emergency/fire detector 56 is tied into a master management system of the building 2, and hence would signal trouble to the control system 40 under the circumstance of any emergency within the building 2. In an emergency condition, the vehicle barriers 48, 50 and door 8 could be held opened, as for a bomb threat, or could be held locked, in response to a child-abduction in the building 2.

A credit card center 64 may also be connected to the control system 40, directly or via the modem 54, as will be further discussed below. A local service facility 58 is connected directly to the control system 40, or connected to the control system 40 via the modem 54. The local service facility 58 could be manned a security person located onsite of the building 2, such as at a guard desk in the lobby of the building 2. Alternatively, or in addition, a remote service facility 60 could connected directly to the control system 40, or connected via the modem 54. The remote service facility 60 would be located offsite, and would service the parking garages of several different buildings 2.

As also illustrated in FIG. 4, a presence detector, such as an electric eye system 62, is connected to the control system 40. The electric eye system 62 includes one or more transmitter/receiver sets, arranged proximate the vehicle entrance 4 and/or exit 6. In FIG. 2 a first transmitter/receiver set 70 is located closer to the first barrier 48 of the vehicle entrance 4, as compared to a second transmitter/receiver set 72. Therefore, a vehicle or person entering via the vehicle entrance 4 will trigger the first transmitter/receiver set 70 prior to triggering the second transmitter/receiver set 72. Each transmitter/receiver set 70, 72 is located sufficiently high so that it is unlikely that a pedestrian will step over the light beam. Yet, each transmitter/receiver set 70, 72 is not located so high that the light beams will pass over a vehicle.

The electric eye system 62 may be embodied as an infrared light beam transmitter and receiver for detecting the passage of vehicles or people past the vehicle entrance 4. Of course, other types of electric eye systems may be employed to detect the passage of vehicles or people past the vehicle entrance 4, such as an ultra-sonic transmitter/receiver set. As illustrated in FIG. 2, the electric eye system 62 may also include third and fourth transmitter/receiver sets 74, 76, arranged proximate the vehicle exit 6, to detect the passage of vehicles and people past the vehicle exit 6, in a like manner.

As also illustrated in FIG. 4, a loop detector system 64 is connected to the control system 40. The loop detector system 64 includes one or more loop detectors, arranged proximate the vehicle entrance 4 and/or exit 6. In FIG. 2, a first loop detector 78 is located closer to the first barrier 48 of the vehicle entrance 4, as compared to a second loop detector 80. Therefore, a vehicle entering via the vehicle entrance 4 will trigger the first loop detector 78 prior to triggering the second loop detector 80. In typical installations, the loop detectors also act as the inside and outside safety loops for the door or gate.

The loop detectors 78, 80 may be embodied as coils of wire, which act as metal detectors. A large amount of metal, characteristic of a vehicle, will influence a current in the coil of a loop detector, and indicate the presence of a vehicle. Of course, other types of loop detectors may be employed to detect the presence of a vehicle, such as a weight sensor. A typical weight sensor would include a loop-shaped area formed in the entrance ramp which transmits a surface weight to a sensor beneath, such as a piezo-electric strain gauge. As illustrated in FIG. 2, the loop detector system 64 may also include third and fourth loop detectors 82, 84, arranged proximate the vehicle exit 6, to detect the passage of vehicles past the vehicle exit 6, in a like manner.

Figure 5:
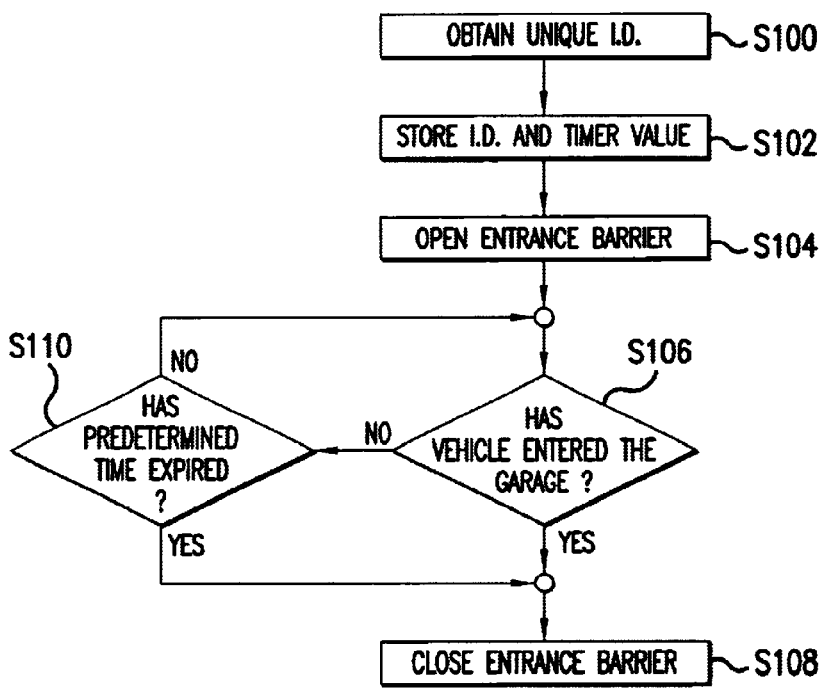
FIG. 5 is a flow chart illustrating a method of operation for allowing a vehicle to enter a parking area.

FIG. 5 is a flow chart illustrating a first aspect of operation for the present invention. The first aspect of operation relates to a vehicle or person's entrance into the parking area, e.g. parking garage. When entering the garage, a customer's vehicle approaches the first customer terminal 10 via the entrance ramp 12. The customer reviews rules posted at the first customer terminal 10 or at a billboard 66 attached to the building 2. The customer is instructed to present their driver's license or a credit card (hereinafter referred to as a customer's common card) to the card reader 24. In FIG. 3, the card reader 24 is provided in a pedestal-type customer terminal 10, and accessed directly by the customer. However, other types of customer terminals may house the card reader 24. For example, the card reader 24 may be provided in a customer terminal, taking the form of a customer counter or parking attendant's booth, and accessed by handing the card to an attendant.

In step S100, the card reader obtains unique identifying information from a bar code, magnetic strip or the like, on the customer's common card. It is not important that the control system 40 be able to actually identify the individual, but rather that the control system 40 simply be able to obtain unique data associated with the customer's common card.

In step S102, the control system 40 stores the read identification data in the memory 52 along with a timer value, as taken from the timer 53. Then, in step S104, the control system 40 sends a signal to the first actuator 42 to open the first barrier 48 to permit the vehicle or person to enter the parking garage. In step S106, it is determined whether or not the vehicle or person has entered the parking garage using the loop detector system 64 or electric eye system 62. If not, the control system 40 goes to step S110. If so, the method proceeds to step S108 and the control system 40 sends a signal to the first actuator 42 to close the first barrier 48.

If the vehicle or person has not entered the parking garage, the control system 40 monitors the timer 53, in step S110, to see if a predetermined time has elapsed. For example, the predetermined time may be approximately 10 to 15 seconds. If the time since the opening actuation of the first barrier 48 has not yet exceeded the predetermined time, the process returns to step S106 to check if the vehicle has entered the parking garage yet. If the time since the opening actuation of the first barrier 48 has exceeded the predetermined time, the process goes to step S108 and the first barrier 48 is closed. This is a "time-out" procedure, whereby the first barrier 48 is not left open indefinitely.

Once a vehicle has entered and parked in the parking garage, it is customary for a person to leave the vehicle and go perform tasks in the building 2 or outside the building 2. In this regard, the person will need to exit the parking garage via a door leading to a street, stairway, or elevator room. FIGS. 1 and 2 illustrate a door 8 leading to a street. The door 8 is constructed to allow people to freely leave the parking garage. However, the door 8 is locked to prevent people from entering the parking garage. Of course, other similar doors 8 could be provided to control access to the garage from an elevator room, lobby, etc.

Figure 6:
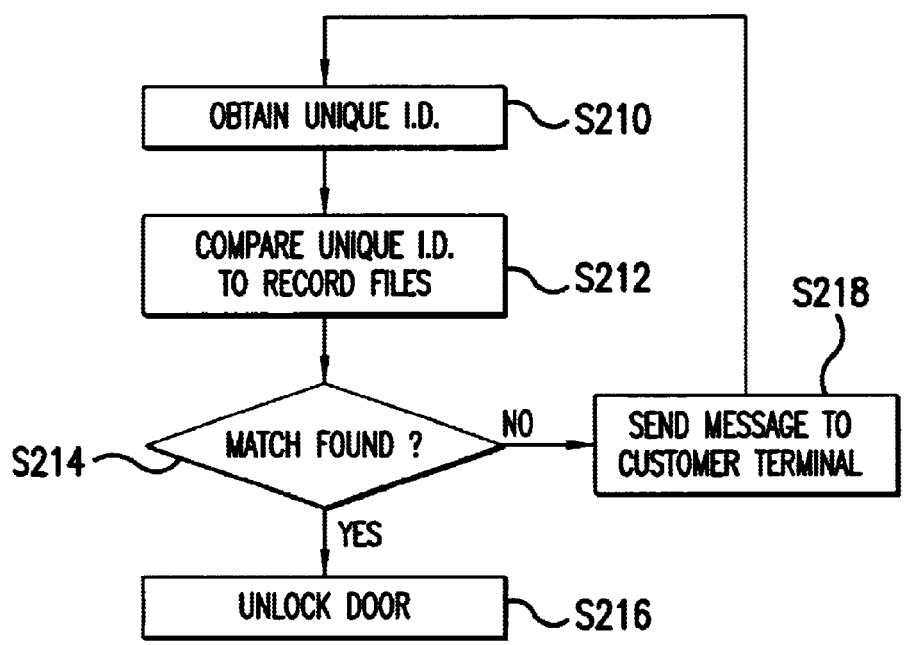
FIG. 6 is a flow chart illustrating a method of operation for allowing foot traffic into the parking area.

FIG. 6 is a flow chart illustrating a second aspect of operation of the present invention. The second method of operation relates to a person's ability to regain walking entrance into the parking garage. To regain entry into the parking garage, a person presents their customer's common card (e.g. driver's license or credit card) to the card reader 24 of the second customer terminal 16. In step S210, the card reader 24 of the second customer terminal 16 obtains unique identifying information from the bar code, magnetic strip, or the like of the customer's common card.

In step S212, the control system 40 compares the identifying information obtained in step S210 to the identifying information records stored in the memory 52. In step S214, it is determined if a match is found. If so, processing proceeds to step S216. In step S216, the control system 40 sends a signal to the door lock 46 to unlock the door 8, such as by withdrawing a deadbolt via a solenoid or de-energizing a magnetic lock. This allows the person to enter the garage.

If no match is found in step S214, processing proceeds to step S218. In step S218, a message is displayed to the person at the second customer terminal 16, via the video display 32, that the customer's common card presented was not previously used to gain access to the parking garage. The person is instructed to try again, or to call for assistance using the handset 26.

For example, assume that a car rental agency has rental cars parked inside the parking area. If a person wishes to enter the parking area to obtain a rented car, the person will be asked to insert their customer card into a card reader 24 provided at the rental agency desk. The control system 40 will allow the person to enter the door 8, and perhaps a series of doors inside the parking area, so as to provide the person with an accessible path to the rental cars parked in the parking area. The control system 40 could also allow the person to exit the parking area with a rental car, using the same customer card.

Figure 7:
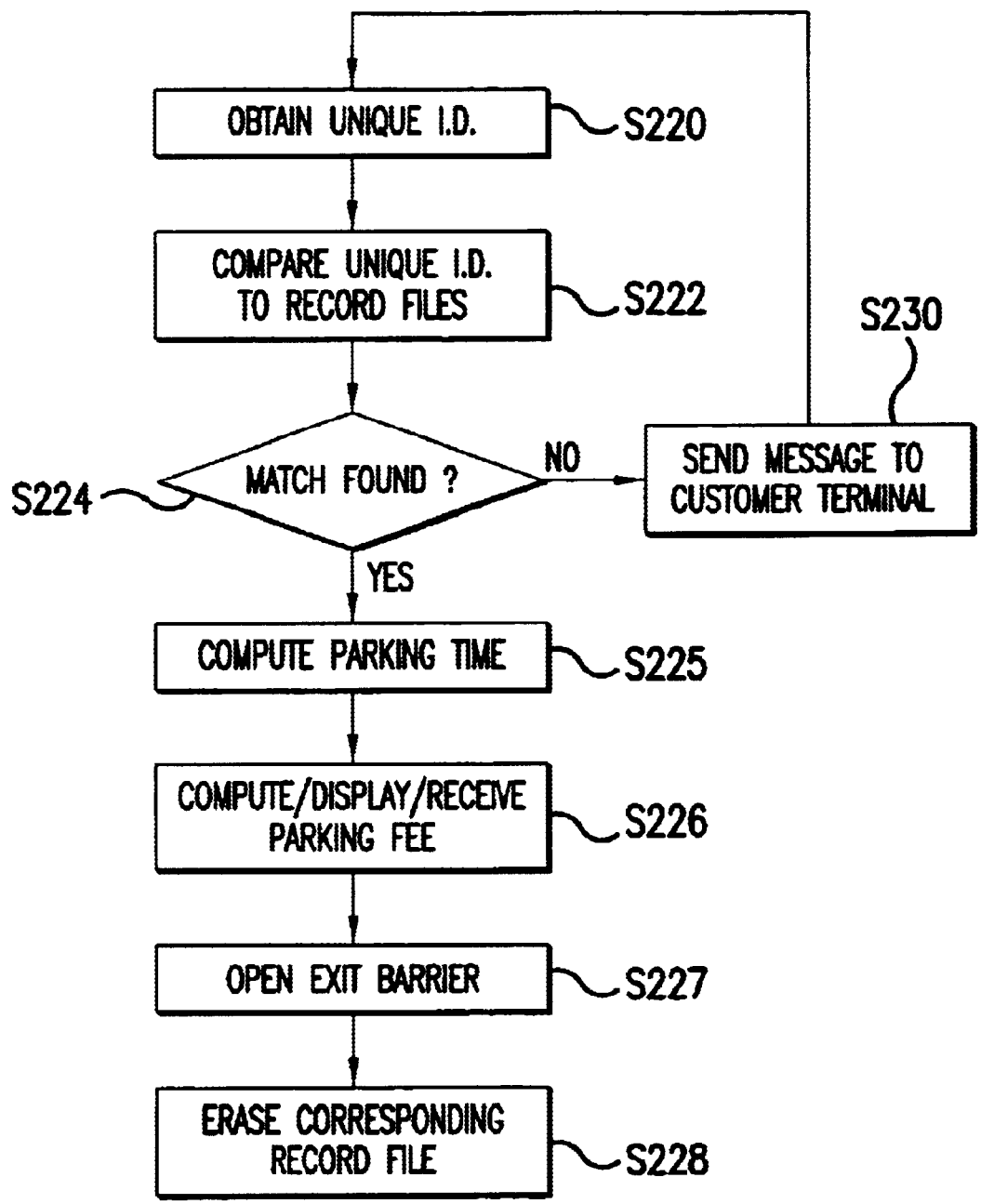
FIG. 7 is a flow chart illustrating a method of operation for allowing a vehicle to exit the parking area.

FIG. 7 is a flow chart illustrating a third method of operation for the present invention. The third method of operation relates to when the person exits the parking garage with their vehicle. To exit the parking garage, the person must present their customer's common card to the card reader 24 of the third customer terminal 20. In step S220, the card reader 24 of the third customer terminal 20 obtains unique identifying information from the bar code, magnetic strip, or the like of the customer's common card.

In step S222, the control system 40 compares the identifying information, obtained in step S220, to the identifying information records stored in the memory 52. In step S224, it is determined if a match is found. If so, processing proceeds to step S225. In step S225, the timer value stored along with the matching identifying information record is compared to a present value of the timer 53 and a total parking time is computed.

Next in step S226, a charge for the parking service is computed and displayed to the person at the third customer terminal 30, via the video display 32. The customer then pays for the parking service, either by cash or credit card to the third customer terminal 30 or an attendant, or by putting the charge on an account. After payment is settled, in step S227, the control system 40 sends a signal to the second actuator 44 to open the second barrier 50, and allow the vehicle to exit. Next, in step S228, the control system 40 erases the matching identifying information record from the memory 52. Alternatively, the control system 40 can flag the matching identifying information record. A flagged identifying information record can be erased after some period of time, for example ten days, or can be archived for later use.

If no matching identifying record is found in step S224, processing proceeds to step S230. In step S230, a message is displayed to the person at the third customer terminal 20, via the video display 32, that the customer's common card presented to the card reader 24 of the third customer terminal 20 was not previously used to gain access to the parking garage. The person is instructed to try again, or to call for assistance using the handset 26. A video image of the person can be taken, via the camera 34 of the third customer terminal 20. This video image can be stored in the memory 52, so that should a criminal event later be uncovered, the video image of the person can be retrieved.

The above described system and method of operation offers many advantages in the monitoring and control of a parking garage. First, the system makes is difficult for a person to enter the parking garage, unless that person has a vehicle parked in the parking garage. This reduces the likelihood of having criminals enter the parking garage and causing injury or damage to persons or property in the parking garage.

Second, the system works in cooperation with a person's credit card or driver's license. Presumably, all persons parking a vehicle in the parking garage should have in their possession their driver's license, and most people would have a credit card. Therefore, the parking control system is operating, based upon a card which is already in the possession of the parking patrons. There is no need to create, issue or update any dedicated parking card, which saves time and money for the parking service provider and parking customer. Further, parking customers need not carry an additional card for parking services.

One particular drawback of the prior parking control systems was that parking customers left their parking slips or parking cards in their parked vehicles. This occurrence is highly unlikely in the present system. People are very much in the habit of keeping their credit cards and driver's license in their wallets or purses, and would be very unlikely to leave their credit card or driver's license behind in a parked vehicle. Therefore, should a thief steal a vehicle from the parking garage, the thief would not have a credit card or driver's license with a matching identifying record stored in the memory 52. Therefore, the thief would call attention to himself when trying to leave the parking garage, and a video image of the thief would be stored in the memory 52.

Of course, a paper slip could still be issued by the parking control system of the present invention. However, the paper slip would not be used to exit the parking area, but would serve to identify the parking area, such as by address or a service provider's name. Such a slip could be carried by the parking customer to remind them where their vehicle is parked.

Although a credit card may be employed by the system, a person's credit card number might only be used to uniquely distinguish the person. It would not be necessary to identify the person, validate the credit card, or make any charge to the credit card. Rather, the credit card is used to make a unique identification record to be stored in the memory 52. Of course, if credit cards were used, it would be possible to charge the credit card for the parking services, if the customer desired.

If a problem occurs at the parking area, such as a theft, vandalism, robbery, assault, etc., then the credit card account information on file at the time of the event could be used to track down the holders of the driver's licenses or credit cards. In this way, it is possible to reconstruct a list of those persons who may have been injured, suffered a loss of property, witnessed a crime, or be a suspect in the crime.

Of course, there will be special circumstances where a different person, not in possession of the customer's common card, will legitimately need to remove a vehicle form the parking garage. Take for example, the instance where a person has driven their vehicle to the parking garage, parked, and then left on a business trip. A spouse picks up the vehicle, later that day. The spouse would be unable to use the same customer's common card to gain entrance into the parking garage, via the door 8.

However, the spouse could speak with a guard, or remote service person, via the handset 26 and explain the situation. The guard could then instruct the person to insert another customer's common card into the card reader 24 of the second customer terminal 16. The control system 40 would respond to customer's common card, and an override command issued by the guard or remote service facility 60, and would unlock the door 8 and create a new identifying information record in the memory 52. By this arrangement, the spouse could exit the parking garage using the spouse's customer's common card at the third customer terminal 20.

One particular advantage of the present invention is that data surrounding such special circumstances can be collected and stored for some time. For instance, driver's license information of the alleged spouse could be maintained for several days so as to make sure that no vehicle was stolen during the same time period. Further, the first and second video cameras 3, 23 mounted to view the vehicle entrance and exit area, and the video camera 34 of the customer terminals, can be used to store video images of the person or persons who needed special attention in order to gain entrance into, or exit from, the parking garage. Such measures go along way toward preventing and deterring persons from committing crimes, since their crimes are no long anonymous, and the likelihood that they will be later identified are greatly increased. To this end, it is envisioned that brief video images of all persons entering and exiting the parking garage could be stored for some short period of time. If no usual circumstances surface in the following several days, the video images would be overridden.

Another common problem in conventional parking area management and control systems involves "tailgaters." A "vehicle-type tailgater" involves an unauthorized vehicle closely following an authorized vehicle past the entrance barrier 48 and into the parking area. To exit the parking area, the unauthorized vehicle repeats the tailgating maneuver, and closely follows an authorized vehicle out of the parking area. "Vehicle-type tailgating" leads to lost revenues for the parking service provider. Further, the unscrupulous person who commits "vehicle-type tailgating" is not uniquely identified by the above-described methods of FIGS. 5–7. Therefore, that person could commit a crime inside the parking area and leave the parking area, not having left a recoverable record of their identity.

It is also possible for a person to inadvertently follow an authorized vehicle into a parking area. For example, sometimes the gate or door will remain open a sufficiently long time after an authorized vehicle enters a parking area, which leads a following vehicle to assume that the gate or barrier has malfunctioned. The following person then enters the parking area, and is deemed an "inadvertent" tailgater. The inadvertent tailgater will have problems leaving the parking area since no record of their entrance into the parking area was created. In fact, if the parking area barrier is unattended, the inadvertent tailgater is essentially trapped in the parking garage.

Another common problem in conventional parking area management and control systems involves "pedestrian-type tailgaters." To enter a parking lot, an unauthorized person closely follows behind an authorized vehicle entering the parking area. By this maneuver, the person gains access to the parking area and bypasses the security check of the second customer terminal 16, provided by the foot traffic access door 8. Again, the "pedestrian-type tailgater" is not uniquely identified by the methods of FIGS. 5–7, and could commit a crime inside the parking area with some degree of anonymity.

Figure 8:
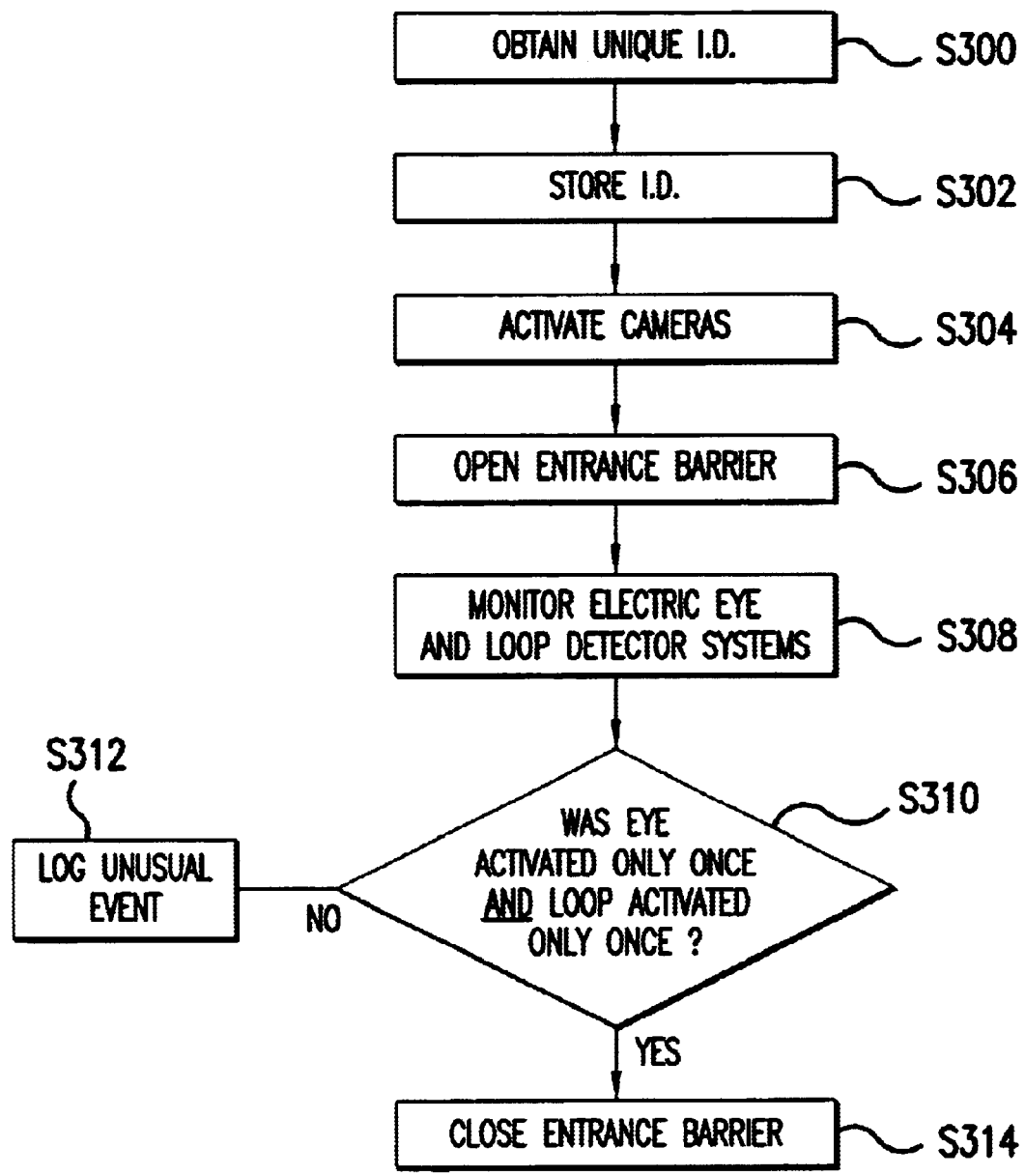
FIG. 8 is a flow chart illustrating a method of operation for discovering vehicle-type and pedestrian-type tailgating into the parking area.

FIG. 8 is a flow chart illustrating a further aspect of operation of the present invention, which enhances the security of the parking area by detecting vehicle-type and pedestrian-type tailgating. In step S300, the unique identifying information is obtained from the customer's common card, via the card reader 24 of the first customer terminal 10. In step S302, the unique identifying information is sent to the control system 40 and stored in memory 52. Next, in step S304, the first camera 3 and the second camera 23 are activated. By activating the first and second cameras 3, 23, it is possible to store video images of the vehicle entrance and exit area.

Next, in step S306, the entrance barrier 48 is opened. Then, in step S308, the outputs of the electric eye system 62 and the loop detector system 64 are monitored while the entrance barrier 48 is opened (see steps S106 and S110, in FIG. 5), and the process goes to step S310. In step S310, if the first loop detector 78 is activated only once and the first electric eye 70 is activated only once, prior to the first barrier closing, the control system 40 determines that only one authorized vehicle entered the parking garage, and the process goes to step S312, otherwise, the process goes to step S314. In step S314, the control system 40 sends a signal to the first actuator 42 to close the entrance barrier 48.

In step S312, the control system 40 notes that an unusual event has occurred. A log of the unusual event is stored in the memory 52. For example, if the first electric eye 70 was activated more than once and the first loop detector 78 was activated more than once, it is highly possible that a vehicle-type tailgating occurred. If the first electric eye was activated more than once and the first loop detector was activated only once, it is highly possible that a pedestrian-type tailgating occurred.

Whenever an unusual event occurs, the control system 40 will send an alarm signal to the local service facility 58 and/or the remote service facility 60. The video images of the first and second cameras 3, 23 will be stored in the memory 52. The images may be later evaluated by authorized personnel to determine if a vehicle-type tailgating or pedestrian-type tailgating actually occurred. Further, the images can be used to reveal the license plate and/or identity of the vehicle of person performing any vehicle-type or pedestrian-type tailgating.

If a vehicle has normally entered the parking area, as in step S314, the system can flag the video images. The flagged video images can be stored in the memory 52 for some period of time, e.g. ten days. However, it is envisioned, from a practical standpoint, that flagged images will eventually be erased or overwritten. By saving all video images for some period of time, it is possible to reconstruct comings and goings of vehicles relative to the parking area, should some criminal event surface later. For example, if an assault is reported to the parking service personnel several hours after it actually occurred, the video images would be available to determine the identities of vehicles entering and exiting the parking area around the time of the incident.

If desired, the electric eye system can include a second transmitter/receiver set 72 offset laterally from the first transmitter/receiver set 70. The second transmitter/receiver set 72 makes it highly unlikely that a pedestrian will pass by the electric eye system 62 undetected, such as by stepping over the light beam. Further, by providing a laterally displaced second transmitter/receiver set 72, the control system 40 can determine the direction of movement of the pedestrian, i.e. whether the pedestrian entered the parking area as an authorized vehicle entered, or whether the pedestrian exited the parking area, via the entrance, as an authorized vehicle entered the parking area.

Also, if desired the loop detector system 64 can include a second loop detector 80 offset laterally from the first loop detector 78. By providing a laterally displaced second loop detector 80, the control system 40 can determine the direction of movement of a vehicle, i.e. whether the vehicle entered the parking area when the entrance barrier 48 opened, or whether the vehicle exited the parking area when the entrance barrier 48 opened.

It is also envisioned that multiple transmitter/receiver sets 74, 76 and multiple loop detectors 82, 84 could be employed in conjunction with the vehicle exit barrier 50. By this arrangement, a method similar to FIG. 8 could be employed to detect, and record video images of, vehicle-type tailgating and pedestrian-type tailgating at the vehicle exit.

The drawings have illustrated one entrance barrier 48, one exit barrier 50 and one pedestrian door 8. Of course, in practice, the parking garage could include a plurality of entrance and exit barriers, and a plurality of pedestrian doors 8, with each having a customer terminal cooperating with the control system 40. Further, the parking area could have a single barrier that allows both pedestrians and vehicles to enter and exit.

Further, the drawings have illustrated a parking garage, however the same advantages of the invention could be obtained with a parking lot. For example, a fenced-in, surrounded parking lot could be provided with vehicle barriers and pedestrian gates to control and monitor the parking lot in a manner similar and analogous the system describe above in relation to the parking garage.

By the present invention, a card reader outside of a parking area barrier, acting in combination with inside and outside loop detectors and electric eyes (typical safety controls for doors and gates), can be organized by a control system to trigger alarms and cameras when non-normal sequences occur. The programming of the control system, in accordance with the present invention, opens a timed window to allow a pedestrian to enter a garage to retrieve their vehicle, even after the garage closes, yet the control system stays vigilant to detect tailgaters and unauthorized pedestrians.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking area management system comprising:
    a first customer terminal to be disposed proximate a vehicle entrance of a parking area, said first customer terminal including a first card reader for reading identification information from an identity card carrier by a user that is issued by an entity than a parking area management entity;
    a second customer terminal to be disposed proximate a vehicle exit of the parking area, said second customer terminal including a second card reader for reading identification information from an identity card carried by a user that is issued by entity other than a parking area management entity; and
    a control system communicatively connected to said first customer terminal and said second customer terminal, wherein said control system stores identification information received from said first card reader in a memory, and wherein said control system outputs a first control signal for actuating a barrier associated with the vehicle exit of the parking area, when identification information received from said second card reader corresponds to identification information stored in said memory.

2. The parking area management system according to claim 1, further comprising:
    a third customer terminal to be disposed proximate a pedestrian entrance to the parking area, said third customer terminal including a third card reader for reading identification information from an identity card carried by a user that is issued by an entity other than a parking area management entity, wherein said control system is also communicatively connected to said third customer terminal, and wherein said control system outputs an open signal for unlocking a lock or locks associated with one or more barriers blocking the pedestrian entrance, when identification information received from said third card reader corresponds to identification information stored in said memory.

3. The parking area management system according to claim 1, wherein said control system outputs an alert signal for alerting an attendant, when identification information received from said second card reader does not correspond to identification information stored in said memory.

4. The parking area management system according to claim 3, further comprising:

a video camera to be disposed proximate said second customer terminal, wherein said control system is also communicatively connected to said video camera, and wherein said control system stores a video image of a person by said second customer terminal whenever the alert signal is generated, or any non-normal activity occurs.

5. The parking area management system according to claim 1, wherein after said control system determines that identification information received from said second card reader corresponds to identification information stored in said memory, said control system flags the corresponding identification information stored in said memory for later erasure.

6. The parking area management system according to claim 1, further comprising:
a timer associated with said control system, wherein said control system sends a charge signal, indicating a charge due for the parking service, to said second customer terminal based upon a time interval defined between when said first card reader receives identification information and when said second card reader receives the same identification information.

7. The parking area management system according to claim 1, further comprising:
a presence detector to be disposed proximate the entrance of the parking area, wherein said control system is also communicatively connected to said presence detector, wherein said control system analyzes an output of said presence detector to determine if a pedestrian or another vehicle has followed behind an entering vehicle into the parking area.

8. The parking area management system according to claim 7, further comprising:
a video camera to be disposed proximate the entrance of the parking area, wherein said control system is also communicatively connected to said video camera, wherein a video image or images of the entrance are taken as a vehicle enters the parking area and the video images are stored whenever said control system determines that a pedestrian or another vehicle has followed behind an entering vehicle into the parking area.

9. A parking area and management system comprising:
a first barrier disposed at a vehicle entrance to said parking area;
a first customer terminal disposed proximate said vehicle entrance of said parking area, said first customer terminal including a first card reader for reading identification information from an identity card carried by a user that is issued by an entity other than a parking area management entity;
a second barrier disposed at a vehicle exit from said parking area;
a second customer terminal disposed proximate said vehicle exit of said parking area, said second customer terminal including a second card reader for reading identification information from an identity card carried by a user that is issued by an entity other than a parking area management entity; and
a control system communicatively connected to said first customer terminal and said second customer terminal, wherein said control system stores identification information received from said first card reader in a memory and outputs a first control signal for opening said first barrier after the identification information is received from said first card reader, and wherein said control system outputs a second control signal for opening said second barrier, when identification information received from said second card reader corresponds to identification information stored in said memory.

10. The parking area and management system according to claim 9, wherein said first barrier and said second barrier are garage doors, swing gates or slide gates.

11. A method of controlling entrance to, and exit from, a parking area, said method comprising the steps of:
providing a first barrier for a vehicle entrance to the parking area, with a first card reader proximate the first barrier;
providing a second barrier for a vehicle exit from the parking area, with a second card reader proximate the second barrier;
reading information from an identity card carried by a user that is issued by an entity other than a parking area management entity presented to the first card reader;
recording the information read by the first card reader as a record in a record file;
opening the first barrier to allow entrance of a vehicle or person into the parking area;
reading information from an identity card carried by a user that is issued by an entity other than a parking area management entity presented to the second card reader; and
comparing the information read by the second card reader to records in the record file, and based upon the comparison, opening the second barrier to allow exiting of a vehicle or person from the parking area or issuing an alert signal.

12. The method according to claim 11, wherein the card presented to the first and second card readers is a driver's license.

13. The method according to claim 12, wherein the information read from the card is taken from a bar code or magnetic strip provided on the driver's license.

14. The method according to claim 11, wherein the card presented to the first and second card readers is a credit card.

15. The method according to claim 14, wherein the information read from the card is taken from a bar code, magnetic strip or raised indicia provided on the credit card.

16. The method according to claim 11, further comprising the steps of:
providing a third barrier for foot traffic entrance to, or exit from, the parking area, with a third card reader adjacent to the third barrier;
reading information from a card presented to the third card reader; and
comparing the information read by the third card reader to records in the record file, and based upon the comparison unlocking the third barrier to allow entrance to, or exit from, the parking area.

17. The parking area management system according to claim 7, wherein said presence detector is an electric eye system.

18. The method according to claim 16, further comprising the steps of:
providing a fourth barrier for foot traffic, the fourth barrier being located inside the parking area; and
based upon said comparing step, unlocking the fourth barrier to allow a person access to a path leading to a designated portion of the parking area.

* * * * *